(12) United States Patent
Liu et al.

(10) Patent No.: US 6,490,181 B1
(45) Date of Patent: Dec. 3, 2002

(54) APPARATUS FOR REDUCING COMMON MODE NOISE CURRENT IN POWER CONVERTERS

(75) Inventors: Chui-Pong Joe Liu, Hong Kong (CN); Ngai-Kit Franki Poon, Hong Kong (CN); Man-Hay Bryan Pong, Hong Kong (CN)

(73) Assignee: The University of Hong Kong, Hong Kong (CN)

( * ) Notice: Subject to any disclaimer, the term of this patent is extended or adjusted under 35 U.S.C. 154(b) by 0 days.

(21) Appl. No.: 09/939,068

(22) Filed: Aug. 24, 2001

(51) Int. Cl.[7] .................................................. H02M 1/12
(52) U.S. Cl. ................................................................ 363/40
(58) Field of Search ............................... 363/39, 40, 47, 363/48

(56) References Cited

U.S. PATENT DOCUMENTS

| | | | | |
|---|---|---|---|---|
| 4,683,529 A | * | 7/1987 | Bucher | 363/44 |
| 4,888,675 A | * | 12/1989 | Kumar et al. | 363/47 |
| 5,077,543 A | * | 12/1991 | Carlile | 363/47 |
| 5,111,373 A | * | 5/1992 | Higaki | 363/39 |
| 5,319,535 A | * | 6/1994 | Brennen | 363/40 |
| 5,636,112 A | * | 6/1997 | Faulk | 363/48 |
| 5,905,642 A | * | 5/1999 | Hammond | 363/39 |
| 6,122,849 A | * | 9/2000 | Enjeti et al. | 363/47 |
| 6,137,392 A | * | 10/2000 | Herbert | 363/24 |
| 6,288,915 B1 | * | 9/2001 | Stemmler et al. | 363/48 |

* cited by examiner

*Primary Examiner*—Jeffrey Sterrett
(74) *Attorney, Agent, or Firm*—Pennie & Edmonds LLP

(57) ABSTRACT

An apparatus for reducing electromagnetic interference due to common mode current in power converters is disclosed. Common mode current flowing through high parasitic capacitance on the load side typically contributes significantly to the electromagnetic interference. In order to reduce the electromagnetic interference the common mode current is reduced by reducing the voltage driving a current through the high parasitic capacitance. A counter-acting voltage source produces a voltage out of phase with the voltage driving the common mode current. Such a counter-acting voltage is obtained with the aid of a winding coupled to the magnetic component in the power converter or by one or more active components. The counter-acting voltage source is connected in series with a capacitance element connected between the input and output sides of the converter-input terminal and output terminal when electrical isolation between the input and the output is desired.

14 Claims, 8 Drawing Sheets

APPARATUS FOR REDUCING COMMON MODE NOISE CURRENT IN POWER CONVERTERS

FIELD OF THE INVENTION

This invention relates to the field of power converters, and in particular to reducing noise due to generation of Electromagnetic Interference by power converters.

BACKGROUND OF THE INVENTION

A power converter provides power by converting power from a source into a form suitable for a load of interest. For instance, a power converter can provide DC power from an AC source. An acceptable commercially viable power converter needs to ensure that the Electromagnetic Interference (EMI) generated by its operation does not exceed acceptable levels. While there are many mechanisms responsible for the generation of EMI, a well-known component of EMI is common mode noise. A switching power converter generates common mode noise as a result of the switching operations in the presence of a low impedance path to ground. Typically, common mode noise due to common mode current flow makes up a significant fraction of the electromagnetic interference (EMI) generated by a switching power converter.

In a switching power converter, the switching circuit receives input power from the input terminals and then produces a switching waveform across the main transformer. The switching waveform so produced is coupled through inter-winding capacitance as well as secondary winding to the secondary side. This secondary winding feeds power to the rectifying circuit which in turn produces power to the load.

In addition to the above described power distribution, there is a path for common mode current responsible for the common mode noise. Switching operations generate noise, which is coupled through transformer inter-winding capacitance to the secondary side. In general the load is isolated from earth but it has fairly high capacitance coupled to earth. This capacitance, together with transformer inter-winding capacitance provides the path for common mode current to flow through the power source impedance by completing the circuit. Any current through the detected power source impedance contributes to conducted electromagnetic interference. The complete common mode current path has a noise source coupled with inter-winding capacitance, which, in turn, forms a complete loop with the power source impedance and the parasitic capacitance on the load side.

Reduction of common mode noise in switching power converters presents a difficult problem. In particular, a switch mode power converter with isolation transformers presents numerous challenges. Usually this type of power converter has close coupling between the primary and secondary windings. Such close coupling reduces leakage inductance and improves conversion efficiency. However, the close coupling, i.e., high transformer coupling coefficient, increases inter-winding capacitance between the primary and the secondary windings and this increases undesirable noise coupling from the primary side to the secondary load side.

Typically, a bypass capacitor connecting two "non-switching" nodes on the primary side and the secondary side respectively reduces the common mode current. A usual choice of nodes is one of the input terminals and the secondary common node. This reduces the common mode current coupled through parasitic capacitance between the load and earth. However this method has its limitations. Safety standards prevent use of high-capacitance because this will increase leakage current between the primary and secondary side.

Placing a sheet of shielding metal known as the "Faraday shield" between the secondary and primary windings also reduces the common mode current. This strategy works on the same principle as the bypass capacitor and provides an additional shunt path for the noise current. It effectively provides another capacitance path in parallel with the bypass capacitor. However, the shield makes the transformer very bulky and reduces magnetic coupling between primary and secondary windings. In turn, this reduces the converter efficiency—an undesirable outcome.

Yet another commonly known method exploits passive filtering by making use of bulky filtering components to suppress noise. This method is widely used but is becoming increasingly undesirable due to the additional components required and the resulting large size of the device.

In U.S. Pat. No. 6,137,392, Edward Herbert's invention uses two or more transformers connected in series to reduce the overall parasitic capacitance between primary and secondary windings. This approach also requires additional magnetic components and tedious magnetic component construction. Moreover, theoretically this approach cannot completely eliminate noise coupling through the isolation transformer.

SUMMARY OF THE INVENTION

The present invention significantly reduces the undesirable common mode noise generated due to the flow of common mode current. The invention provides a counter-acting voltage to reduce or even eliminate the common mode current. The counter-acting voltage source and the components connected in series to it actively operate to absorb, bypass or cancel out the noise generated by the operation of the power converter.

An embodiment of the invention comprises a counter-acting voltage derived from a set of winding in the main transformer with further fine-tuning by external passive components connected in series. Typically, the series components include capacitors to maintain electrical isolation between the transformer and secondary windings. Moreover, the combination of voltage source and series components is conveniently coupled to "non-switching" nodes on the primary and secondary sides.

Alternate embodiments of the invention generate the counter-acting voltage with a buffer amplifier. Such an amplifier senses the noise voltage of the series connected components and produces an out of phase voltage with similar amplitude in order to reduce the noise voltage across the path.

In yet another embodiment of the invention, the counter-acting source is actively controlled actively by amplifying components and suitable feedback. The amplifying components in response to detecting generated noise provide a counter-acting signal to prevent the noise current from coupling through external earth.

Furthermore, the present invention is easily extended to reduce electromagnetic interference due to non-isolated converters.

Accordingly, the invention enables noise reduction with simple and low component count method without requiring tedious transformer construction so that the transformer can be conveniently built with well-known technique. Moreover, the present invention provides noise reduction without requiring precise adjustment of difficult to control parameters such as transformer leakage inductance.

These and other aspects of the present invention will become apparent to those skilled in the art from the following detailed description of the invention and from the accompanying drawings.

DETAILED DESCRIPTION OF THE INVENTION

In order to reduce or eliminate common mode current flow through the parasitic capacitance, the present invention includes a counteracting voltage source connected in series to an impedance and to the noise-generating source driving the common mode current. As a result the effective impedance of the series impedance is reduced in a manner inversely proportional to the difference between the magnitude of the counter-acting voltage source and the voltage across the series impedance without the counter-acting voltage source. In other words, the counteracting voltage works like an "impedance reducer." The resultant reduction in the noise voltage drop provides an efficient bypass for the noise source current. This bypass strategy actively absorbs the noise current more effectively than just a bypass capacitor. In other words, the strategy provides an effectively small value bypass capacitor while providing a large effective bypass capacitance for noise reduction.

Figure 1:
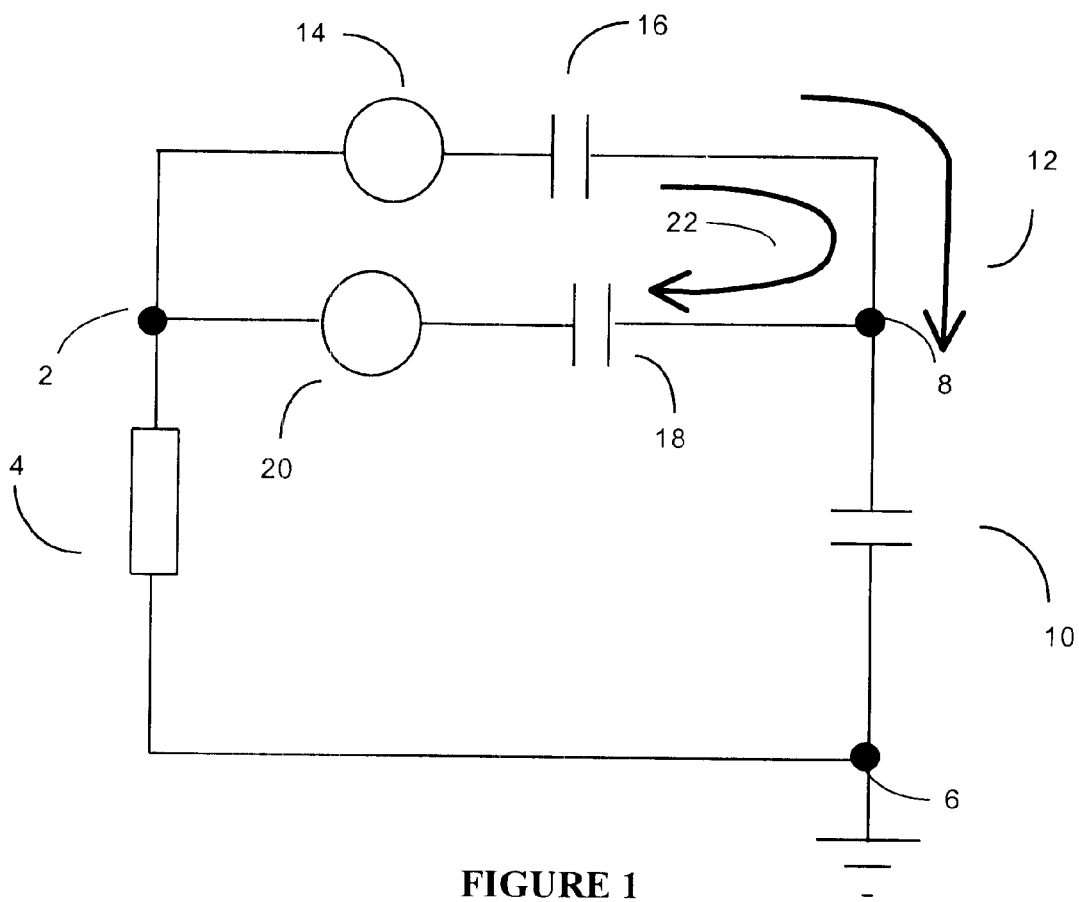
FIG. 1 is a schematic diagram of a circuit corresponding to an embodiment for reducing or canceling common mode noise in accordance with the invention.

FIG. 1 illustrates the arrangement described above. Input node 2 has an input impedance 4 with respect to the ground 6. Output node 8 exhibits a parasitic capacitance 10 relative to the ground. Parasitic capacitance 10 allows common mode current 12 to flow due to the noise source 14 connected to the series capacitance 16. This common mode current is reduced by shunting it via the series impedance 18, and further reduced by counter-acting voltage source 20.

Figure 2:
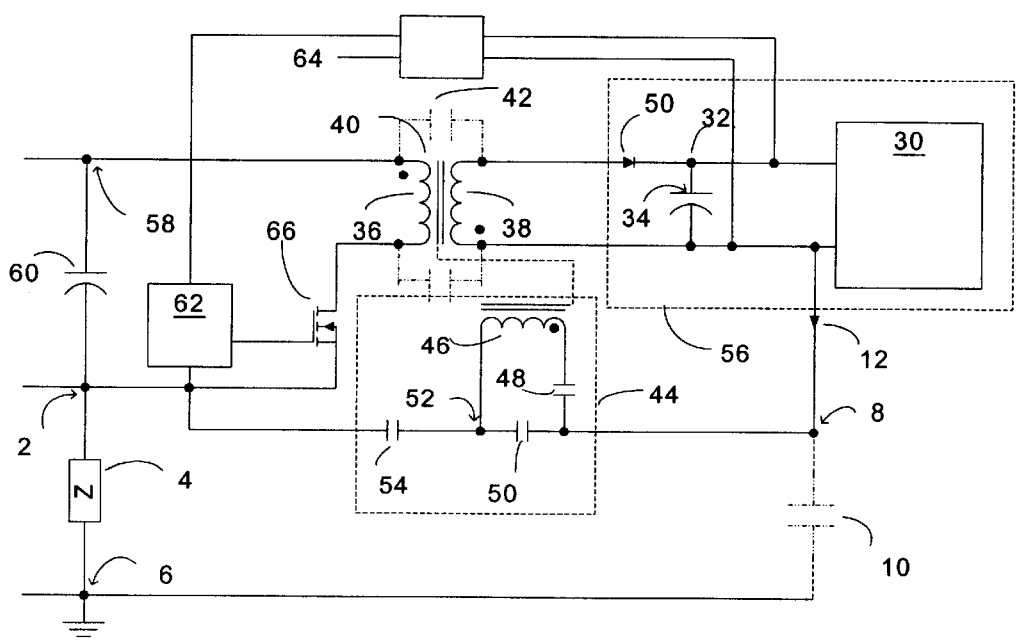
FIG. 2 is a simplified diagram showing an example of connections using magnetically coupled winding to generate the counter-acting voltage.

FIG. 2 shows an embodiment of the invention providing a counter-acting voltage to reduce common mode current. As shown, transformer 40, comprising windings 36 and 38 and the inevitably present inter-winding capacitance 42 provides power to a rectifier having, for instance, diode 50, and an output capacitor 34 connected to node 32 and across load 30. The voltage across load 30 is sensed by isolated device 64 for providing a feedback signal to the switch controller 62 for regulating the output voltage via switch 66. In addition to the above, FIG. 2 also illustrates counter-acting voltage provided by counter-acting winding 46 across voltage dividing elements 48 and 50 acting together as a passive divider for adjusting the counter-acting voltage. The adjusted counter-acting voltage reduces common mode current 12 flowing through series element 54 by reducing the voltage across series element 54. In other words, the counter-acting voltage generated in FIG. 2 reduces the potential difference between nodes 2 and 8, thus reducing common mode current 12 to ground 6.

As is apparent to one of ordinary skill in the art, the counter-acting voltage need not be provided only by counter-acting winding 46. Additional mechanisms for providing the counter-acting voltage are intended to be within the scope of the invention. Thus, the elements shown within box 44 formed by a broken line can be replaced by a voltage source providing a counter-acting voltage V and an impedance $Z_1$ in series to ensure electrical isolation between the input and output. Theoretically, for eliminating the common mode current this requires $$V=IXZ_1 \qquad \text{Eqn.1}$$

where I is the common mode current through impedance $Z_1$ in the presence of the voltage source V. No common mode current will flow through parasitic capacitance 10 between the load and the earth. This means the coupled noise can be perfectly bypassed and the noise coupling through by the inter-winding parasitic capacitance can be contained. In practice, the noise voltage may not be completely cancelled across node 2 and node 8 because of the error in adjusting V and $Z_1$. Therefore, at least the amplitude of the common mode current will be greatly reduced when compared with known methods. In addition, the required magnitude of impedance $Z_1$ is greatly reduced for noise immunity and effectively produces a short circuit between node 2 and node 8.

Counter-acting voltage source is realized by counter-acting winding 46 coupled to the isolation transformer 40. Counter-acting winding 46 is wound to produce counter-acting voltage. The winding voltage of isolation transformer 40 is suitable for producing the counter-acting voltage because it can produce the same waveform as the switching noise produced by switching circuit in the primary. Voltage across counter-acting winding 46 is divided by passive components as shown. With voltage-dividing element 48 having impedance $Z_3$ and voltage-dividing element 50 having impedance $Z_2$, the counter-acting voltage is obtained from the voltage across voltage-dividing element 50.

$$V = I \frac{Z_1 \times Z_2 + Z_2 \times Z_3 + Z_1 \times Z_3}{Z_2} \qquad \text{Eqn. 2}$$

Here I is the noise current coupled through inter-winding parasitic capacitance between the transformer windings 36 and 38 and V is the voltage across counter-acting winding 46. Of course, in practice, the noise voltage may not be completely cancelled because of error in adjusting impedances $Z_1$, $Z_2$ and $Z_3$ resulting in a distorted counter-acting voltage V (with respect to the noise voltage).

Figure 3:
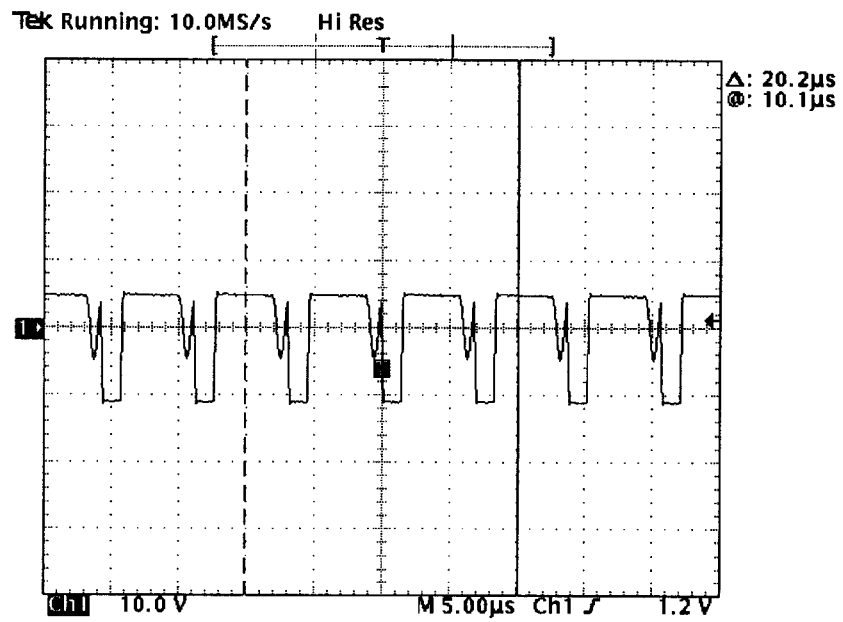
FIG. 3 shows the noise voltage across the primary and secondary of a prior art power converter.
Figure 4:
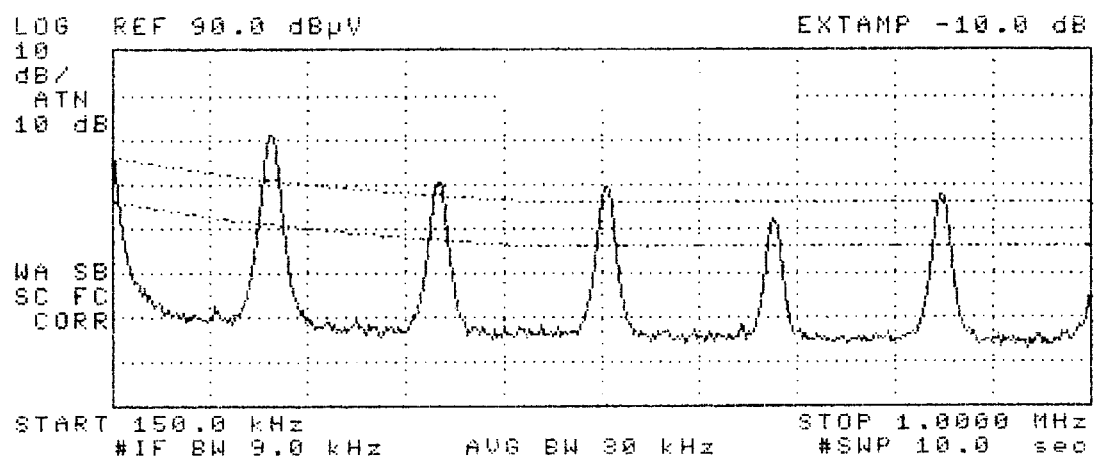
FIG. 4 illustrates the common mode current corresponding to the noise voltage of FIG. 3.
Figure 5:
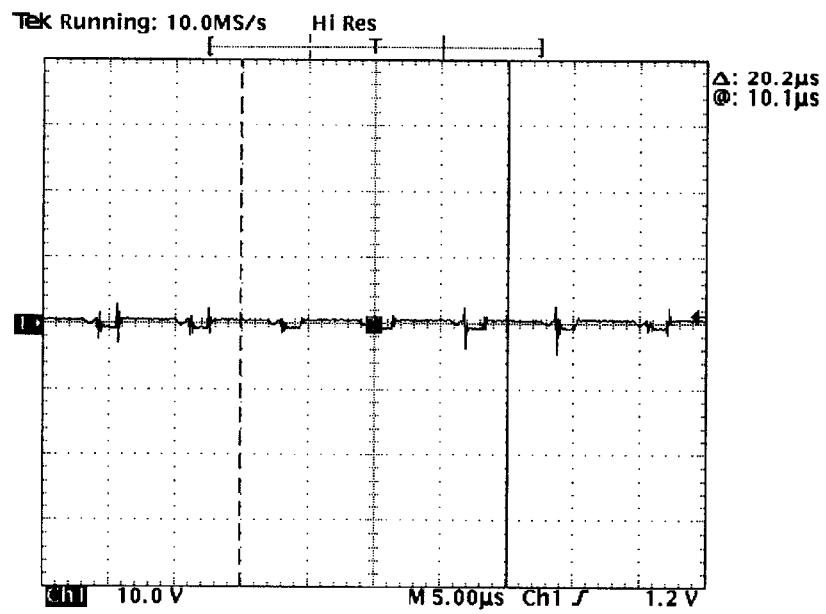
FIG. 5 shows the noise voltage across the primary and secondary non-switching nodes of the flyback converter with reduction of common mode current in accordance with the invention.
Figure 6:
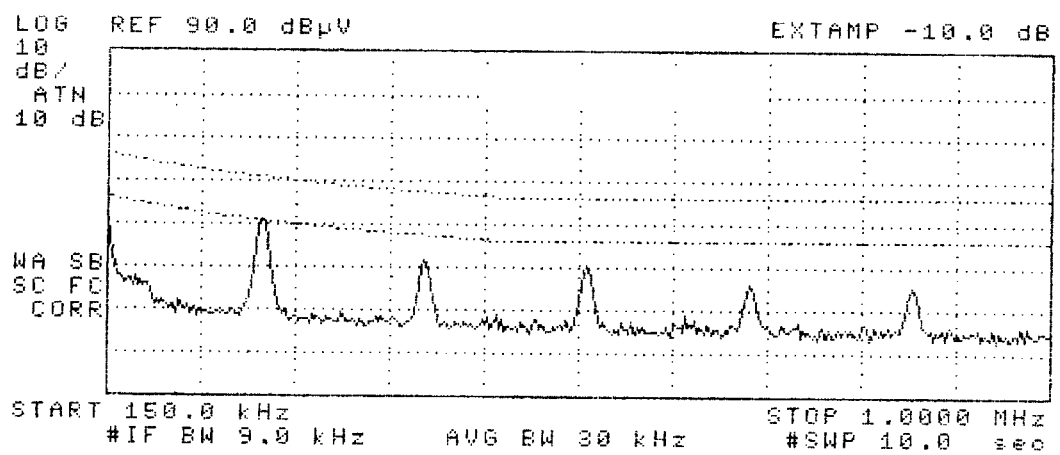
FIG. 6 illustrates the common mode current corresponding to the noise voltage of FIG. 5.

FIG. 3 shows the measured noise voltage across node 2 and node 8 without deploying counter-acting winding 46, voltage-dividing elements 48 and 50, series element 54 are replaced by a bypass capacitor of 1500 pF. FIG. 4 shows the corresponding measured common mode current spectrum. FIG. 5 shows the measured noise voltage across node 2 and node 8 with the use of counter-acting winding 46, voltage-dividing elements 48 and 50, series element 54 as illustrated in FIG. 2. The turns ratio of windings 36, 38 and 46 are 30:10:3 and the values for series element 54, and voltage dividing elements 50 and 48 are 1500 pF, 470 pF and 6800 pF respectively (which straightforwardly provide the respective impedance values). Notably, series element 54 has the same value as the bypass capacitor used in the previous case for fair comparison. A comparison of FIGS. 3 and 5 reveals a significant reduction in the noise voltage across node 2 and node 8. The corresponding improved, relative to FIG. 4, common mode current spectrum is shown in FIG. 6.

Figure 7:
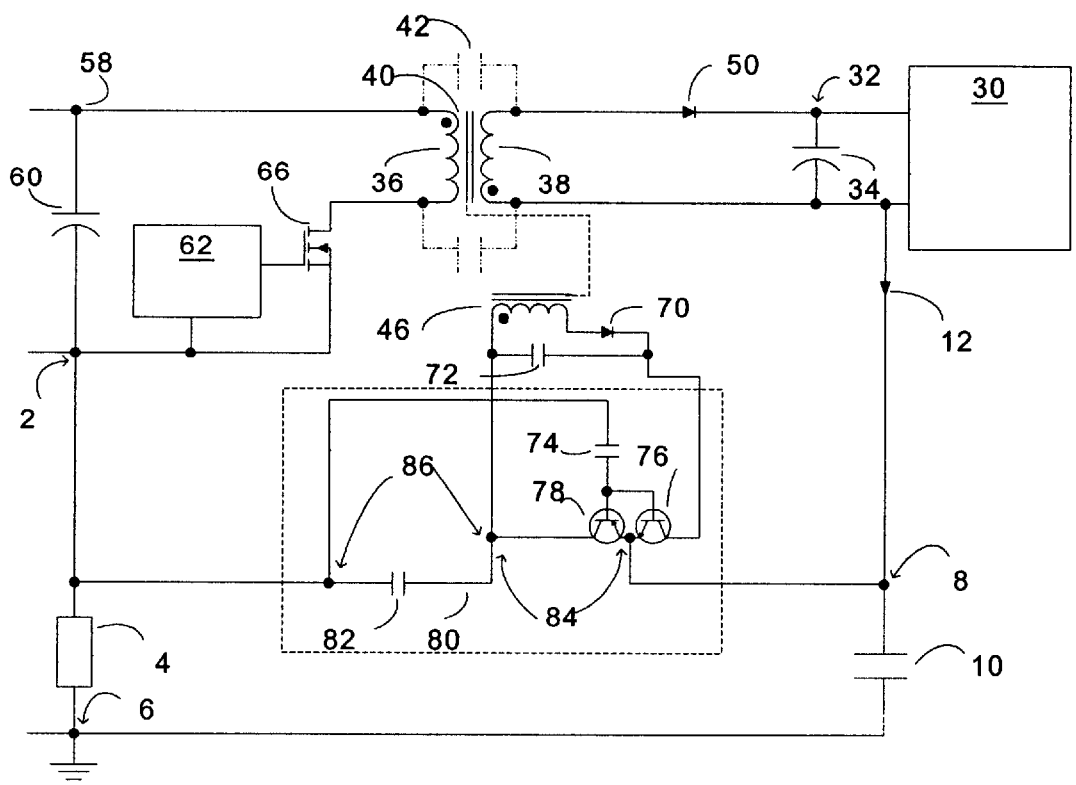
FIG. 7 is another embodiment of the invention using amplifying circuit to generate the counter-acting voltage.

FIG. 7 shows a second embodiment of the invention for providing a counter-acting voltage to reduce common mode current with the aid of an amplifying device to amplify a noise signal to provide a counter-acting voltage. The amplifying device in this embodiment is a four-terminal amplifying device formed by transistors 76 and 78 with input nodes 86 and output nodes 84. The amplifying device is driven by counter-acting winding 46, which provides power to the aforesaid amplifying device via diode 70 and across smoothing capacitor 72. The input nodes 86 sense the noise voltage across series element 82. Transistors 76 and 78 connected to provide a totem pole driver to implement a buffer circuit, generate amplify the sensed noise voltage and provide a corresponding counter-acting voltage across output nodes 84. The input of the totem pole driver receives the noise voltage across series element 82 and the output terminals of the totem pole driver across output nodes 84 produces the required counter-acting voltage. The totem pole output has a phase opposite to that of the noise voltage and cancels out the noise voltage between node 2 and node 8 thus reducing the common mode current.

The amplification of the noise voltage should be sufficiently great for reducing the common mode current. Of course, in general, the output counter-current voltage should not substantially exceed the noise voltage to avoid driving a current in the other direction. In principle, common mode current could be reduced to zero with appropriate amplification. FIG. 7 is illustrative and other amplification providing architectures are intended to be within the scope of the invention.

Figure 8:
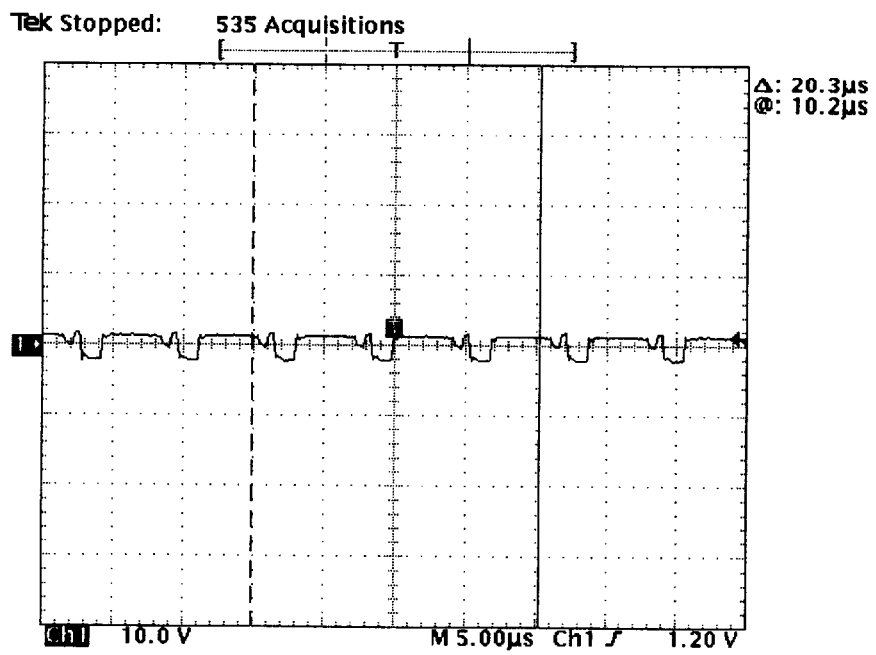
FIG. 8 shows the noise voltage across the primary and secondary non-switching nodes of the converter of FIG. 7 with reduction of common mode current in accordance with the invention.
Figure 9:
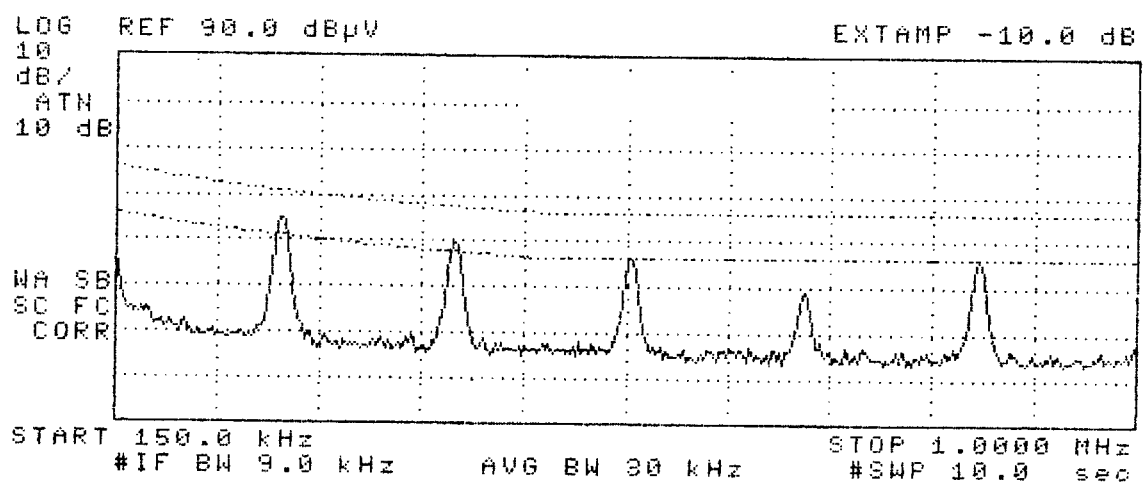
FIG. 9 illustrates the reduced common mode current corresponding to the noise voltage of FIG. 8.

FIG. 8 shows the measured noise voltage across node 2 and node 8 with the use of the amplifying architecture of FIG. 7. A comparison of FIGS. 3 and 8 reveals a significant reduction in the noise voltage across node 2 and node 8 along with the corresponding common mode current spectrum shown in FIG. 9, which, in turn, reveals the reduction in the common mode current compared to FIG. 4.

Figure 10:
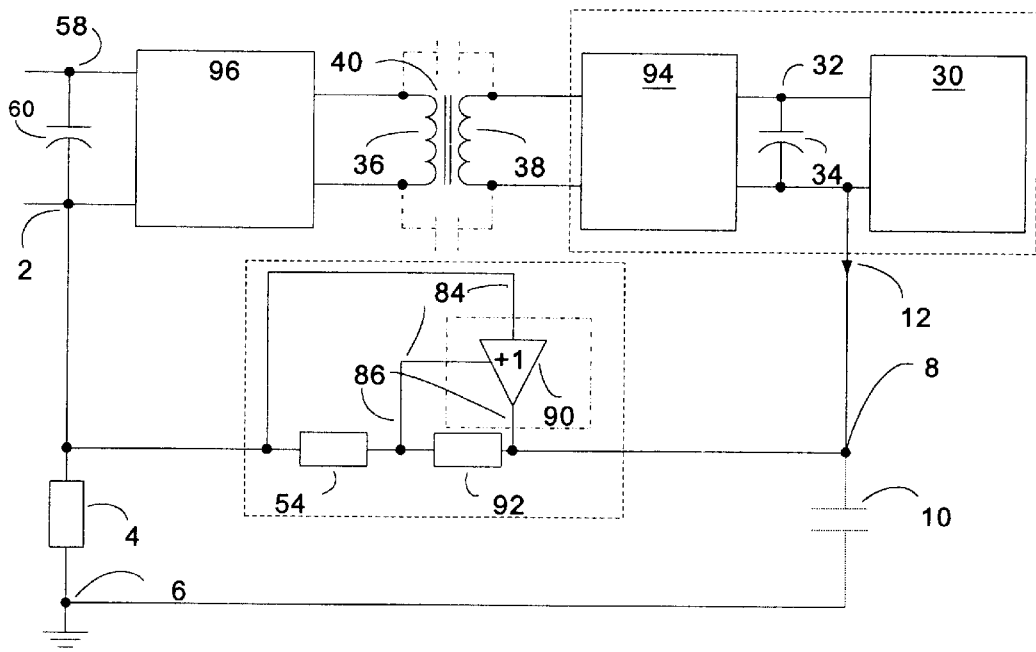
FIG. 10 illustrates another embodiment of the invention.

FIG. 10 is an exemplary implementation utilizing an amplifying device similar to the second embodiment described above. This embodiment shows a power converter with at least one switching circuit 96 and at least one rectifying module 94. The four terminal amplifying device is implemented with a buffer 90. Buffer input 84 and output 86 share a common node as shown. Input terminals 84 sense noise voltage across the series element 54 and generate the counter-acting voltage as described before. Since the gain of buffer amplifier 90 generates counter-acting voltage sufficient for cancellation of the noise voltage across series element 54, no amplitude adjustment is required. However, it should be noted that the amplifier gain, in general, is greater than one in many embodiments of the invention. In other words, the specification of the amplifier gain is not a limitation on the possible embodiments. Element 92 provides frequency compensation, if required, depending on the frequency response of buffer 90 over the noise frequency range. Series element 54 enables coupling of counter-acting voltage.

Figure 11:
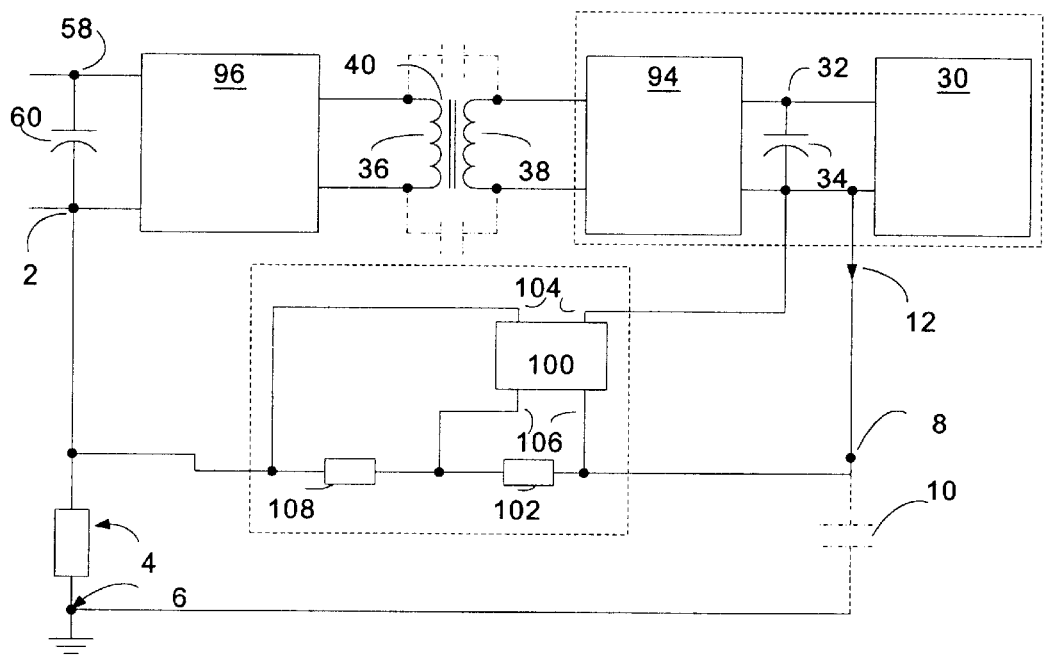
FIG. 11 illustrates yet another embodiment of the invention.

FIG. 11 illustrates another embodiment of the invention comprising a power converter with an isolation transformer. An amplifier 100 represented by a four terminal device has a pair of input 104 and output 106 terminals. Input terminal 104 accepts a signal corresponding to noise voltage between converter primary and secondary side as shown. Output terminal 106 produces a corresponding counter-acting voltage. The principle of operation is explained next.

The third embodiment shown in FIG. 11 makes use of amplifying component to generate the counter-acting voltage to cancel out noise voltage across secondary common node 8 and primary switching circuit input terminal 2. Active component 100 generates the counter-acting voltage. Unlike the second embodiment, this embodiment senses noise voltage across nodes 2 and 8 of the primary and the secondary non-switching nodes directly. Counter-acting voltage is then generated at the output terminals of active component 100 connected across the output 106 comprising secondary node 8 and across an impedance element 102 connected back to the primary input node 2 via impedance element 108. Actually impedance element 108 can also be connected to other nodes with very low impedance to node 2, a typical example of such node is node 58 since the capacitance of input capacitor 60 is usually large enough to provide a low impedance path at the noise frequency. Element 102 is connected across active component 100 for frequency compensation in practical case. It should be noted that the active component 100 must be able to provide enough gain at frequencies concerned in order to minimize error voltage which may produce common mode current flowing through parasitic capacitance 10 and power source impedance to earth 6. In addition, some protection circuit may be required to protect the active component in order to withstand high isolation voltage between the primary and secondary as required by many safety standards.

Figure 12:
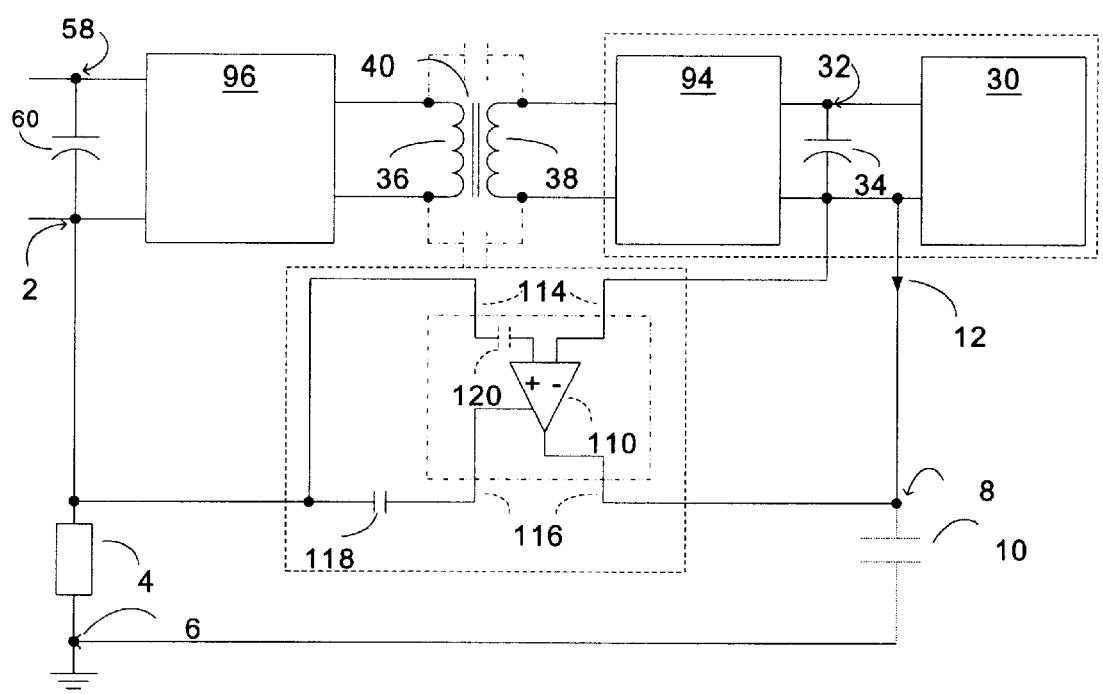
FIG. 12 shows yet another embodiment of the invention.

FIG. 12 is another implementation similar to the third embodiment described above. The four terminal amplifying device is implemented by an operational amplifier 110 and a coupling capacitor 120 for retaining isolation between primary and secondary. The input terminals of operational amplifier 110 sense the noise voltage across the primary and secondary non-switching nodes 2 and 8 respectively through coupling capacitor 120. The operational amplifier 110 generates a counter-acting voltage at output terminals 116. The counter-acting voltage is connected between the primary and secondary nodes 2 and 8 through capacitor 118 to cancel out noise voltage across these two nodes as described before.

The embodiments described herein and the principles in accordance with the invention cover devices and systems for reducing EMI. For instance, they include a common mode noise reducing apparatus for reduction of common mode noise in a switching power converter with an input terminal and an output terminal. The common mode noise reducing apparatus includes means for sensing a signal potential difference corresponding to a potential difference between the output terminal of the switching power converter and the input terminal of the switching power converter. The term terminal includes one of, for instance, two leads used to electrical power or signals. The apparatus further includes a voltage-generating source responsive to the signal potential difference for generating a counter-acting voltage. This counter-acting voltage reduces the potential difference between the output terminal and the input terminal of the switching power converter. Furthermore, a series impedance is coupled to the voltage generating source in a path linking the at least one input terminal and the at least one output terminal via at least one capacitor.

The voltage generating source of the aforementioned common mode noise reducing apparatus can be implemented as a counter-acting winding coupled to a primary winding and to a secondary winding in a power transformer in the switching power converter.

Alternatively, the voltage generating source of the aforementioned common mode noise reducing apparatus is an amplifying device receiving the signal potential difference as an input signal and producing a counter-acting voltage.

The means for sensing the signal potential difference include an impedance connected in series in a path linking the input terminal and the output terminal of the switching power converter. Or alternatively, the means for sensing the signal potential difference include a counter-acting winding coupled to the primary winding and to the secondary winding.

Moreover, an electromagnetic noise-filtering element is advantageously employed to selectively reduce current contributing to the generation of objectionable EMI.

A typical system for converting power with low common mode noise includes a switching power converter having an input terminal and an output terminal with a counter-acting winding coupled to an inductive component, and a capacitor coupled in series to the counter-acting winding to provide isolation between the output and the input.

Of course, many alternative embodiments and variations on the teachings disclosed herein are possible, as is understood by and is apparent to one of ordinary skill in the art. Such embodiments having other specific forms, structures, arrangements, proportions and with other elements, materials and components do not depart from the spirit or essential characteristics of the present invention. Therefore, the embodiments described herein being illustrative and not restrictive, such alternative embodiments and variations are intended to be included within the scope of the claims that follow this description and without the claims being limited by the foregoing description.

We claim:

1. A common mode noise reducing apparatus for reduction of common mode noise in a switching power converter having at least one input terminal and at least one output terminal, the common mode noise reducing apparatus comprising:

means for sensing a signal potential difference corresponding to a potential difference between an output node connected to the at least one output terminal of the switching power converter and an input node connected to the at least one input terminal of the switching power converter;

a voltage generating source producing in response to the signal potential difference a counter-acting voltage wherein voltage generating source is connected to a node such that the counter-acting voltage reduces the potential difference between the output node connected to the at least one output terminal of the switching power converter and the input node connected to the at least one input terminal of the switching power converter; and a series impedance coupled to the voltage generating source in a path linking the at least one input terminal and the at least one output terminal via at least one capacitor.

2. The common mode noise reducing apparatus of claim 1 wherein the voltage generating source is a counter-acting winding coupled to a primary winding and to a secondary winding in a power transformer in the switching power converter.

3. The common mode noise reducing apparatus of claim 1 wherein the voltage generating source includes an amplifying device having at least one output connection and at least one input connection with the at least one input connection receiving the signal potential difference and the at least one output connection of the amplifying device coupled to the path linking the at least one input terminal and the at least one output terminal the switching power converter.

4. The common mode noise reducing apparatus of claim 1 wherein the means for sensing the signal potential difference includes an impedance connected in series in a path linking the at least one input terminal and the at least one output terminal of the switching power converter.

5. The common mode noise reducing apparatus of claim 1 wherein the means for sensing the signal potential difference includes a counter-acting winding coupled to a primary winding and to a secondary winding.

6. A switching power converter with reduced common mode noise, the switching power converter comprising:

a power transformer with a primary winding and a secondary winding;

at least one input terminal;

at least one output terminal, a counter-acting winding coupled to the primary winding and to the secondary winding; and a capacitor coupled in series in a path, the path including the counter-acting winding, the at least one input terminal and the at least one output terminal.

7. The switching power converter of claim 6 wherein the capacitor is coupled to the at least one output terminal via a first node.

8. The switching power converter of claim 6 wherein the capacitor is coupled to the at least one input terminal via a first node.

9. The switching power converter of claim 6 wherein the path further includes an electormagnetic noise-filtering element.

10. A system for converting power with low common mode noise, the system comprising:

a switching power converter having an inductive component;

at least one input terminal;

at least one output terminal, a counter-acting winding coupled to the inductive component;

a capacitor coupled in series to the counter-acting winding and the converter-input terminal.

11. The system for converting power of claim 10 wherein the capacitor coupled to the at least one output terminal via a first node.

12. The system for converting power of claim 10 wherein the capacitor coupled to the at least one input terminal via a first node.

13. The system for converting power of claim 10 further comprising an electromagnetic noise-filtering element coupled to the counter-acting winding.

14. An apparatus for reduction of common mode noise in a switching power converter comprising:
- a switching power converter having at least an input terminal and at least an output terminal;
- means for sensing a signal potential difference corresponding to a common mode current between the at least one input terminal and the at least one output terminal;
- an amplifying device having at least one input connection, the at least one input connection receiving the signal potential difference and at least one output connection;
- means for coupling the at least one output connection of the amplifying device to a path connecting the at least one input terminal to the at least one output terminal whereby the amplifying device produces an alternating voltage that reduces the potential difference between the at least one input terminal to the at least one output terminal.

* * * * *